(12) United States Patent
Herr

(10) Patent No.: US 7,501,627 B1
(45) Date of Patent: Mar. 10, 2009

(54) INTEGRATED ULTRA-SENSITIVE INFRARED SENSOR

(75) Inventor: Douglas A. Herr, Lancaster, PA (US)

(73) Assignee: Lepton Technologies, Inc., Lancaster, PA (US)

( * ) Notice: Subject to any disclaimer, the term of this patent is extended or adjusted under 35 U.S.C. 154(b) by 0 days.

(21) Appl. No.: 11/818,114

(22) Filed: Jun. 13, 2007

Related U.S. Application Data

(60) Provisional application No. 60/816,836, filed on Jun. 27, 2006.

(51) Int. Cl.
*G01J 5/00* (2006.01)
*G01J 5/02* (2006.01)
*G01J 4/00* (2006.01)

(52) U.S. Cl. .......................... 250/338.1; 250/339.06; 356/370

(58) Field of Classification Search ................. 250/330, 250/336.1, 338.1, 334, 339.06, 339.07; 356/370
See application file for complete search history.

(56) References Cited

U.S. PATENT DOCUMENTS

| | | | |
|---|---|---|---|
| 3,675,039 A * | 7/1972 | Boyd et al. ................. | 359/330 |
| 4,891,507 A | 1/1990 | Lindmayer et al. | |
| 4,980,566 A | 12/1990 | Heilweil | |
| 5,012,098 A | 4/1991 | Lindmayer | |
| 5,453,618 A * | 9/1995 | Sutton et al. ................. | 250/334 |
| 5,946,093 A | 8/1999 | DeFreez et al. | |
| 6,649,914 B1 * | 11/2003 | Moorman et al. ...... | 250/363.06 |
| 2006/0054807 A1 * | 3/2006 | Picard et al. ................. | 250/288 |
| 2007/0012879 A1 * | 1/2007 | Testardi ................. | 250/361 R |

* cited by examiner

*Primary Examiner*—David P Porta
*Assistant Examiner*—Faye Boosalis
(74) *Attorney, Agent, or Firm*—Martin Fruitman

(57) ABSTRACT

The apparatus is a miniature assembly which detects very low power infrared radiation and produces an electronic signal. The incoming infrared is combined in a wavelength multiplexer with high energy light from a laser chip and passed through an upconversion crystal (a nonlinear optical crystal) in which their frequencies are added together. The higher frequency, lower wavelength, light is then directed to a miniature blue sensitive photomultiplier tube that generates an electrical signal. A thermoelectric cooler is used to control the temperature of the laser chip, and the entire device is assembled into a package which is approximately the size of a cigarette pack.

8 Claims, 2 Drawing Sheets

INTEGRATED ULTRA-SENSITIVE INFRARED SENSOR

This application claims the benefit of provisional patent application 60/816,836 filed Jun. 27, 2006.

BACKGROUND OF THE INVENTION

This invention deals generally with infrared sensors and more specifically with a miniaturized assembly which detects very low power infrared radiation and converts it into a usable electrical signal.

Low power infrared radiation is very difficult to detect and use electronically because sensitive photodetectors, such as photomultiplier and image intensifier tubes, which convert radiation into electrical signals, have very low sensitivity in the infrared region of the spectrum.

One technique which has been used to overcome this low infrared sensitivity has been the use of special phosphor materials external to the photosensitive tubes. Such materials upconvert, that is, they generate higher frequency and shorter wavelength radiation when stimulated by the infrared radiation, and the higher frequency radiation can then be accommodated by conventional photodetectors. U.S. Pat. Nos. 4,891,507 and 5,012,098 to Lindmayer disclose devices using such phosphors.

U.S. Pat. No. 4,980,566 to Heilweil discloses the use of solid-state nonlinear conversion crystals within an infrared spectrometer, describes what is essentially a table top configuration, and specifies one meter distances within the apparatus.

U.S. Pat. No. 5,946,093 to DeFreez et al describes a particle detection system that uses a solid state lasant in the form of crystal or glass as an upconversion laser. The apparatus apparently has significant dimensions since it includes a volume to contain flowing streams of fluid.

It would be very beneficial to have available for scientific and commercial use a compact robust infrared sensor that has high sensitivity, low noise, high efficiency, and long life. Even greater benefits would result from low manufacturing costs and no need for cryogenic cooling.

SUMMARY OF THE INVENTION

The present invention converts a low power infrared light signal into visible light so that it can be detected by a miniature photomultiplier tube which is sensitive to blue light. The incoming infrared signal is first processed in a wavelength multiplexer by directing it simultaneously into the same linear path with a higher energy light of a narrow wavelength originally generated by a laser diode chip, referred to as a laser pump. The multiplexed signals are then directed into an upconverter, a nonlinear optical crystal, in which the two light beams are actually added together, a process also referred to in the art as sum frequency generation. The single higher frequency (and shorter wavelength) beam is then directed to the blue sensitive photomultiplier tube.

The laser pump, a wavelength narrowing optical cavity, the wavelength multiplexer, the upconversion crystal, the photomultiplier tube, and some optical components are all assembled into a very small assembly with a footprint that can be as small as 6.0 square centimeters. Although the components in the sensor are specific to narrow ranges of wavelengths, these ranges may be chosen to accommodate any wavelength between 0.8 micrometer ($\mu$m) and 5.0 $\mu$m.

The input signal may arrive either from free space or by means of an optical fiber. If the signal is from free space, some collection and focusing optics are required at the input, and the specifics of those components will vary with the application. When the input signal arrives through an optical fiber, an appropriate connector is required on the assembly.

The laser pump is a laser diode chip generating light of a specific wavelength, and it is used to add energy to the input signal. A thermoelectric cooler is used to compensate for environmental temperature variations and stabilize the wavelength of the laser pump and can also be used to cool other components.

In order to achieve efficient upconversion of frequency in the crystal of the later stage of the sensor apparatus, the radiation entering the crystal must be of high purity. High purity is defined as radiation with a narrow range of wavelengths, specifically with less than 0.05 nanometers variation in either direction from its center wavelength. However, commercially available laser diodes producing much wider ranges of wavelengths around 2.0 nanometers can be used when the wider ranges are narrowed by the use of an optical cavity or various conventional electronic devices. Optical cavities are well understood in the art and include a partially reflecting surface. The narrow wavelength range needed for the present invention also requires careful control of the optical cavity length, which may require temperature stabilization.

The sensor can also include various optical components such as lenses, mirrors, and gratings to form and direct the beams. Other components can be limiters for the signal input and for the power from the laser pump, which may be necessary to protect the photodetector from damage.

The present invention thereby provides a robust infrared sensor that has high sensitivity, low noise, high efficiency, and long life and is approximately the size of a cigarette pack.

DETAILED DESCRIPTION OF THE INVENTION

Figure 1:
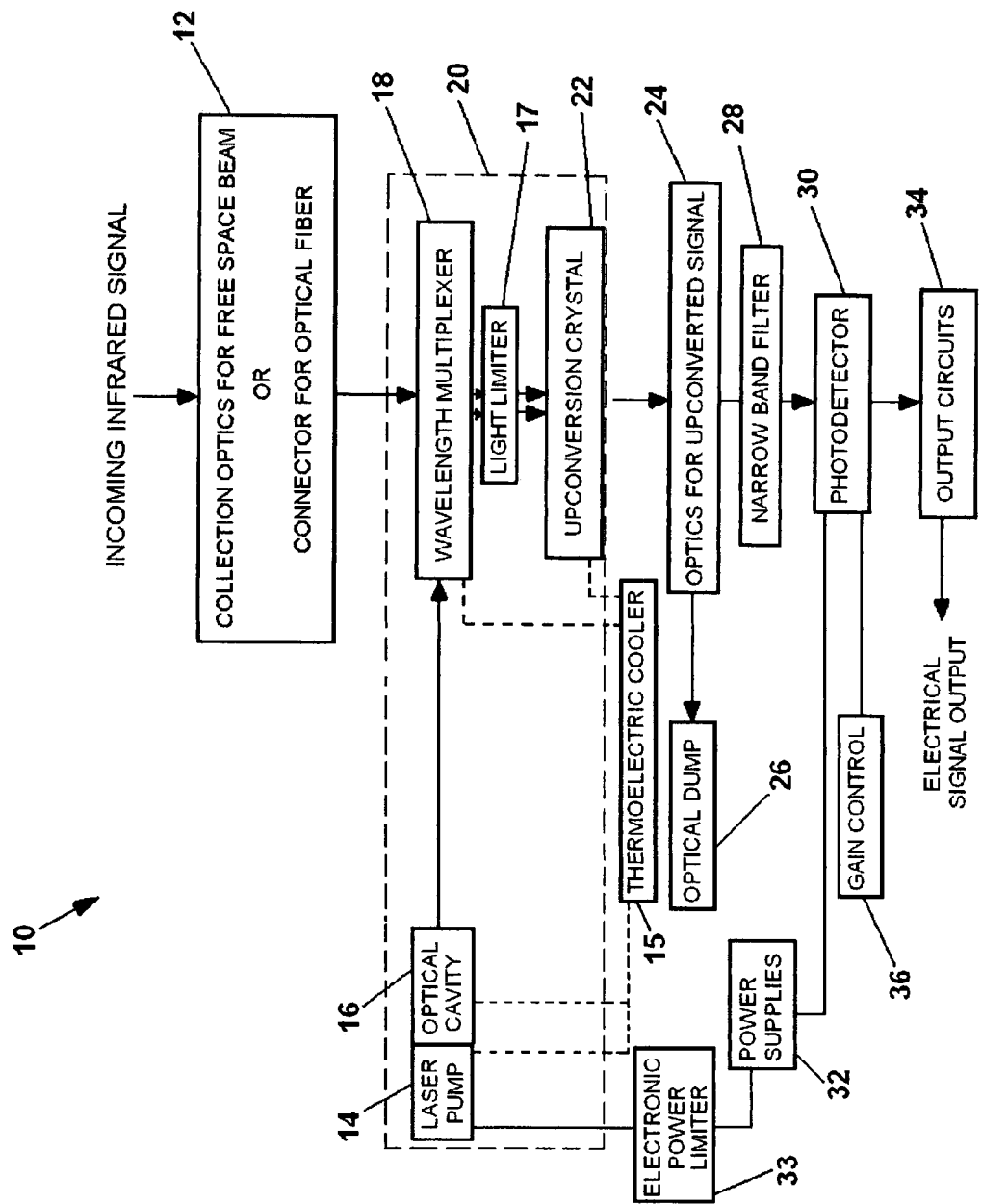
FIG. 1 is a block diagram of the preferred embodiment of the infrared sensor of the invention.
Figure 2:
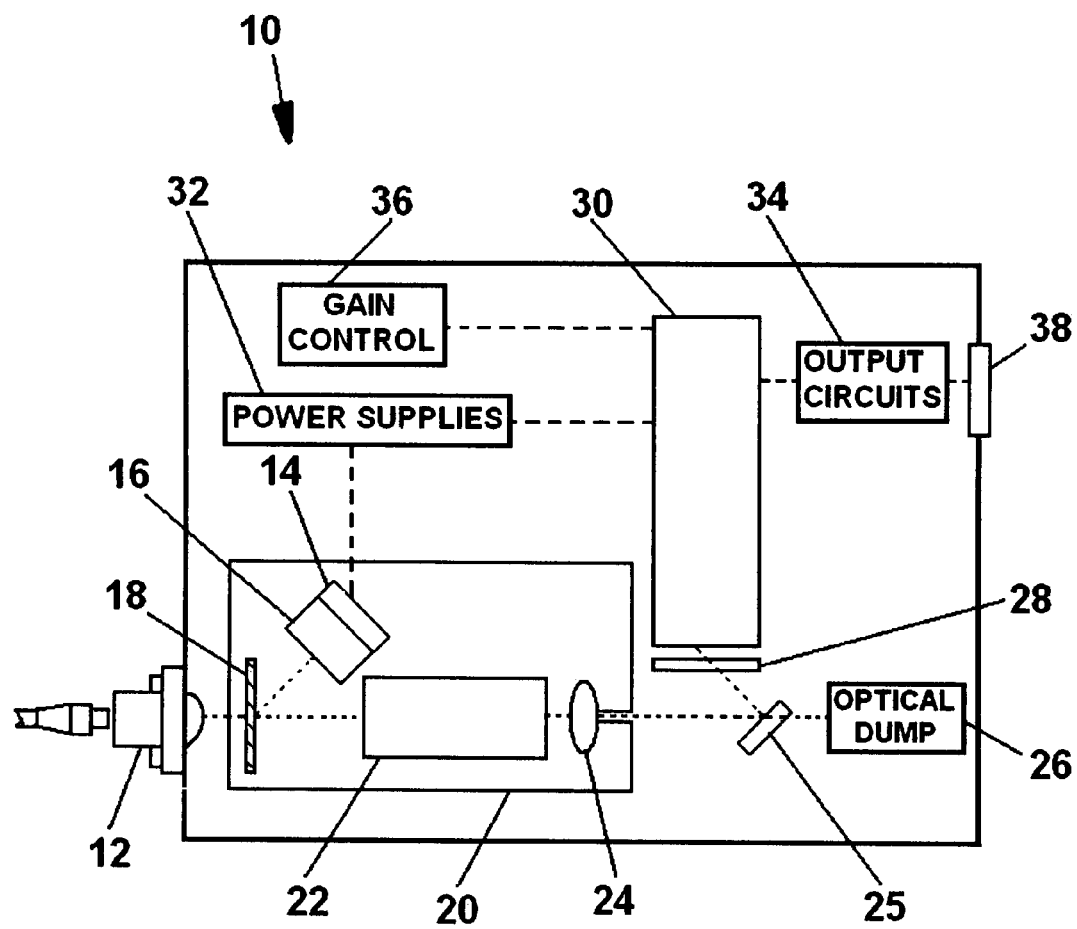
FIG. 2 is a simplified layout diagram of the assembly of the preferred embodiment of the infrared sensor of the invention when the input is an optical fiber.

FIG. 1 is a block diagram and FIG. 2 is a simplified layout diagram of the assembly of the preferred embodiment of infrared sensor 10 of the invention. Components visible in the assembly of FIG. 2 are identified by the same numbers as in FIG. 1.

Input apparatus 12 is an optical assembly when the incoming infrared signal arrives from free space, and is a connector for optical fiber (see FIG. 2) when the infrared signal is delivered by means of a cable of optical fibers. The incoming infrared signal processed by infrared sensor 10 can be in the range of between 0.8 $\mu$m and 5 $\mu$m with the proper selection of components that are described below.

Laser pump 14 is a laser diode chip generating a laser beam of a specific wavelength. In the preferred embodiment of the invention the wavelength generated is 808 nanometers (nm) for use with an incoming signal of 1550 nm. Thermoelectric cooler 15 is used to control the temperature of laser pump 14 to compensate for environmental temperature variations and to stabilize its temperature and the wavelength generated. Thermoelectric cooler 15 or additional thermoelectric coolers can also be used to cool other components, such as optical cavity 16, wavelength multiplexer 18, and upconversion crystal 22.

In order to achieve high efficiency in its upconversion of infrared signal into visible blue light, infrared sensor 10 of the present invention requires an input laser beam into upconversion crystal 22 which has a very small spread in its wavelength, a spread of the order of less than plus or minus 0.05 nm. However, commercially available laser pumps have a spread of the order of 40 times larger. This problem is solved in infrared sensor 10 by directing the laser beam from laser pump 14 through optical cavity 16 before the laser beam enters wavelength multiplexer 18. Optical cavity 16 essentially operates as a frequency (and wavelength) filter, and reduces the wavelength spread to the required value. Optical cavities such as optical cavity 16 are well understood in the art. Typically they are constructed with partially reflecting surfaces and are custom doped for specific wavelengths of light, and the narrow range of wavelengths also requires careful control of the length of optical cavity 16.

Light intensity limiter 17 may be necessary to protect photodetector 30 from damage from excessive light levels. One type of power limiter that is just becoming available is dyes which are transparent at low light signal levels, but become strongly attenuating as the signal levels increase. Electronic power limiter 33 can also be used to limit the light intensity of laser pump 14 by controlling the electrical energy supplied to laser pump 14 from power supplies 32.

The laser beam with the appropriate small wavelength spread from optical cavity 16 and the incoming infrared signal beam from input apparatus 12 are fed into wavelength multiplexer 18 in identical overlapping paths that then directs them into the following upconversion crystal 22.

Several types of such multiplexers are available. One configuration manufactured by Oz Optics in Canada is called a Miniature Inline Wavelength Division Multiplexer. This device uses fused fibers in which the two input light beams are put into close proximity and then coupled into a single output fiber, and it requires fiber couplers to feed the laser pump and incoming signal into the fibers. Oz Optics also manufactures a multiplexer that uses lenses and other conventional optical components, referred to as bulk optics, to combine the beams. The assembly is typically housed in a small package with the beam sources attached.

In the preferred embodiment of invention, wavelength multiplexer 18 uses individual small bulk optical components and, along with laser pump 14 and optical cavity 16, is mounted upon small optical subassembly 20. Upconversion crystal 22 can also be installed on optical subassembly 20 that has a footprint as small as 6.0 square centimeters.

Upconversion or sum frequency generation is well understood in scientific circles. The process relies on matching the speeds of all the beams and phase matching the two input beams and the output beam along one of the crystal axes. The physical property that determines the speed of a beam in a crystal is the index of refraction of the crystal, and that varies with the wavelengths of the beams. However, an upconversion crystal can be selected for which the index of refraction is not too different for the three beams, the two inputs and the output. Nevertheless, there are always some differences that cause some slight mismatch in the speeds. This mismatch can be largely compensated for by building the upconversion crystal with alternate short sections oriented in opposite directions. In practice, crystals are available that are grown with this alternating feature, called periodic poling, and it is a prerequisite for some upconversion crystals.

Since the beams must stay in very close proximity during upconversion, doping a channel into upconversion crystal 22 may also be required. The doped channel is called a waveguide, and this confines the beams to a configuration analogous to an optical fiber in air. For crystals without a waveguide, the confinement of the beams must be controlled by the optics that direct the beams onto the crystal face.

In the preferred embodiment of the invention, upconversion crystal 22 is doped periodically poled lithium niobate (MgO:PPLN). For increased upconversion efficiency the ends of the crystal may be coated, or an external partially reflecting surface may be used to create a cavity. Depending upon the application in which the sensor is used, the crystal may also include an optical waveguide. Sum frequency generation in upconversion crystal 22 produces a crystal output frequency which is directed to photodetector 30 that equals the sum of the frequencies of the incoming signal and the laser pump.

For best cathode response in a photomultiplier tube, the output wavelength from the upconversion crystal should fall in the range of between 300 nm and 550, but for most photomultiplier tubes some sensitivity is available outside this range. The photomultiplier tube cathode sensitivity allows some freedom of choice for the laser pump wavelength and for the periodic poling of the lithium niobate. Tradeoffs can be made to minimize development costs for specific applications. For example, depending upon the efficiency of the upconversion crystal design, some incoming infrared signal, laser pump beam, or harmonics may be present at the upconversion crystal output in addition to the blue upconverted signal, but high quality MgO:PPLN crystals are commercially available to minimize this problem.

One or more optical devices such as lens 24, mirror 25, and narrow band filter 28 (see FIG. 2) can also be used to isolate the desired blue wavelength signal from undesirable wavelengths in the output from the upconversion crystal 22. Such devices as mirror 25 selectively reflect particular wavelengths and direct them into optical dump 26 where they are absorbed. Narrow band filter 28 that simply blocks the undesirable wavelengths may also be used for this purpose, either alone or in combination with selectively reflecting mirrors.

In the preferred embodiment of the invention, a photomultiplier tube has been selected as photodetector 30. Because of the high gain and low noise characteristics of photomultiplier tubes, this gives several thousand times higher sensitivity than with P-I-N junction diodes or avalanche photodiode solid state detectors. The preferred embodiment uses a Hamamatsu R7400 miniature photomultiplier tube.

This choice will depend on the application, and will differ, for example, on whether the application requires photon counting, ruggedized construction, or small size. When small size is important, efficient photomultiplier tubes, such as the one specified above, are available which measure only 18 millimeters in the largest dimension. Although the cathode must be efficient at the blue signal wavelength, it should not be sensitive to other spurious wavelengths that might be present. One example for a sensor with 1550 nm input signal and an 808 nm laser pump that upconverts to 532 nm is the previously mentioned Hamamatsu P7400 which has a bi-alkali cathode, and it has a low sensitivity to 808 nm light. Another type of photomultiplier tube that can be very beneficial for the small beam size of the sensor is one with an internally masked cathode to reduce noise. Although such photomultiplier tubes exist, they are not yet manufactured commercially.

For even greater efficiency the resulting blue light should approach photodetector 30 at an angle other than perpendicular incidence. For a photomultiplier tube such as is used in the preferred embodiment, the exact angle depends on the particular faceplate and cathode material of the model of the photomultiplier tube and the method of coupling the beam to the photomultiplier tube. The preferred embodiment of the invention uses an angular orientation. The angle in the preferred embodiment is 45 degrees to the perpendicular at the point on the faceplate where the beam enters the photomultiplier tube. However, this angle can be in the range of between 30 and 50 degrees.

The sensor of the preferred embodiment also includes power supplies 32 for laser pump 14 and for photodetector 30, and may also include signal output circuits 34, such as a transimpedance amplifier or a digital interface, to accommodate the signal from photodetector 30 to the particular application. Output circuits 34 feed the electrical output signal to output connector 38 (FIG. 2) which is mounted on the sensor case or exterior package and can be connected to other circuitry.

Photodetector gain control circuit 36 may also be added to stabilize the output of photodetector 30. For a photomultiplier tube, gain control circuit 36 can be a circuit for adjusting the ratios of the dynode currents of the tube.

By the use of miniature components the preferred embodiment of sensor 10 is constructed in an assembly that measures only about 25 mm×35 mm×75 mm. These components are mostly commercially available and typical examples are identified in the following list.

Optical fiber connector 12—Oz Optics, MEPMJ-3A-550-8/125-0.40-5-5-0-0.5

Laser pump 14—Sanyo DL, 8031-031A

Thermoelectric cooler 15—Marlow Industries, CP 1.0-71-06

Mirror for Optical cavity 16—Newport, 10J00ER.3

Dichroic Mirror for Wavelength multiplexer 18—Edmund Optics, NT48-561

Optical subassembly 20—Avo Photonics, custom per quote Q070422, part JBD

Upconversion crystal 22—HC Photonics, 3BO-201200-10

Optics 24—Lightpath Technologies, 350670

Optical dump 26—Avo Photonics, custom per quote Q070422

Photodetector 30—Hamamatsu, R7400

There are multiple advantages to sensor 10 of the invention. Integrating several major components onto optical subassembly 20 permits automated high volume manufacture and yields low cost, low power consumption, and small size, and also offers protection against potential damage from shock and vibration. Furthermore, the use of a stabilized photomultiplier tube gives a great sensitivity advantage over other light conversion devices. Sensor 10 can therefore be deployed into environments, including into space, where high sensitivity infrared detectors have previously been unavailable.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, a photodetector other than a photomultiplier tube may be used, and other components can be selected which permit use of the sensor at different wavelengths.

What is claimed as new and for which Letters Patent of the United States are desired to be secured is:

1. An infrared sensor that generates an electrical signal output by converting infrared radiation into shorter wavelength light, comprising:
   an input apparatus receiving infrared incoming radiation and directing the incoming radiation on a path into a wavelength multiplexer;
   a laser pump generating a laser beam of a wavelength shorter than the incoming radiation;
   beam directing apparatus directing the laser beam into the wavelength multiplexer on a path that is identical to and overlaps the path of the incoming radiation;
   a thermoelectric cooler interconnected with and maintaining the laser pump at a stable temperature and the laser beam at a stable wavelength;
   an upconversion crystal coupled with the wavelength multiplexer and receiving the overlapping laser beam and incoming radiation from the wavelength multiplexer and combining the laser beam and the incoming radiation into an output light beam of shorter wavelength than the laser beam; and
   a photodetector to which the output light beam is directed and which converts the output light beam into an electrical signal, the amplitude of which is dependent upon the intensity of the infrared incoming radiation.

2. The infrared sensor of claim 1 wherein the photodetector is a photomultiplier tube with a maximum dimension of 18 mm.

3. The infrared sensor of claim 1 wherein the thermoelectric cooler is also interconnected with and cools the upconversion crystal.

4. The infrared sensor of claim 1 further including an optical cavity which narrows the range of wavelengths furnished by the laser beam.

5. The infrared sensor of claim 1 further including a intensity limiter to protect the photodetector from damage from excessive light levels.

6. The infrared sensor of claim 1 further including a gain control interconnected with the photodetector to stabilize the output of the photodetector.

7. The infrared sensor of claim 1 wherein the laser pump, the wavelength multiplexer, and the upconversion crystal are installed together on an optical subassembly.

8. The infrared sensor of claim 7 wherein an optical cavity is also installed on the optical subassembly.

* * * * *